United States Patent
Ikeda et al.

(10) Patent No.: US 7,372,666 B2
(45) Date of Patent: May 13, 2008

(54) MAGNETIC HEAD WITH ALTERNATELY LAMINATED (110)-ORIENTATION-INDUCING NON-MAGNETIC UNDERLAYERS, MAGNETIC LAYERS, AND DISCONTINUOUS INSULATING LAYERS

(75) Inventors: Shoji Ikeda, Kawasaki (JP); Takayuki Kubomiya, Kawasaki (JP); Masaaki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 313 days.

(21) Appl. No.: 11/098,281

(22) Filed: Apr. 4, 2005

(65) Prior Publication Data

US 2005/0185341 A1    Aug. 25, 2005

Related U.S. Application Data

(63) Continuation of application No. PCT/JP03/05559, filed on Apr. 30, 2003.

(51) Int. Cl.
    *G11B 5/31* (2006.01)
(52) U.S. Cl. ..................................... 360/126
(58) Field of Classification Search ................ 360/126, 360/125, 317
    See application file for complete search history.

(56) References Cited

U.S. PATENT DOCUMENTS

| 4,516,180 | A  | * | 5/1985 | Narishige et al. ............ 360/126 |
| 5,589,221 | A  | * | 12/1996 | Hiramoto et al. ............ 427/130 |
| 6,278,590 | B1 | * | 8/2001 | Gill et al. .................... 360/126 |
| 6,456,466 | B1 | * | 9/2002 | Nakamoto et al. .......... 360/319 |

FOREIGN PATENT DOCUMENTS

| JP | 08-213234 | | 8/1996 |
| JP | 09-097714 | | 4/1997 |
| JP | 2001015339 A | * | 1/2001 |
| JP | 2003-100515 | | 4/2003 |

* cited by examiner

*Primary Examiner*—Craig A. Renner
(74) *Attorney, Agent, or Firm*—Greer, Burns & Crain, Ltd.

(57) ABSTRACT

A magnetic head according to the present invention includes a write magnetic pole on which a magnetic film has been formed, and is characterized by the magnetic film being formed by alternately laminating magnetic layers, which have iron (Fe) and cobalt (Co) as main components, and insulating layers, the insulating layers being formed as discontinuous films. With this construction, it is possible to form a write magnetic pole that has a high Bs value and high permeability, so that it is possible to provide a magnetic head that can record onto a high-density medium with a high coercive force.

6 Claims, 6 Drawing Sheets

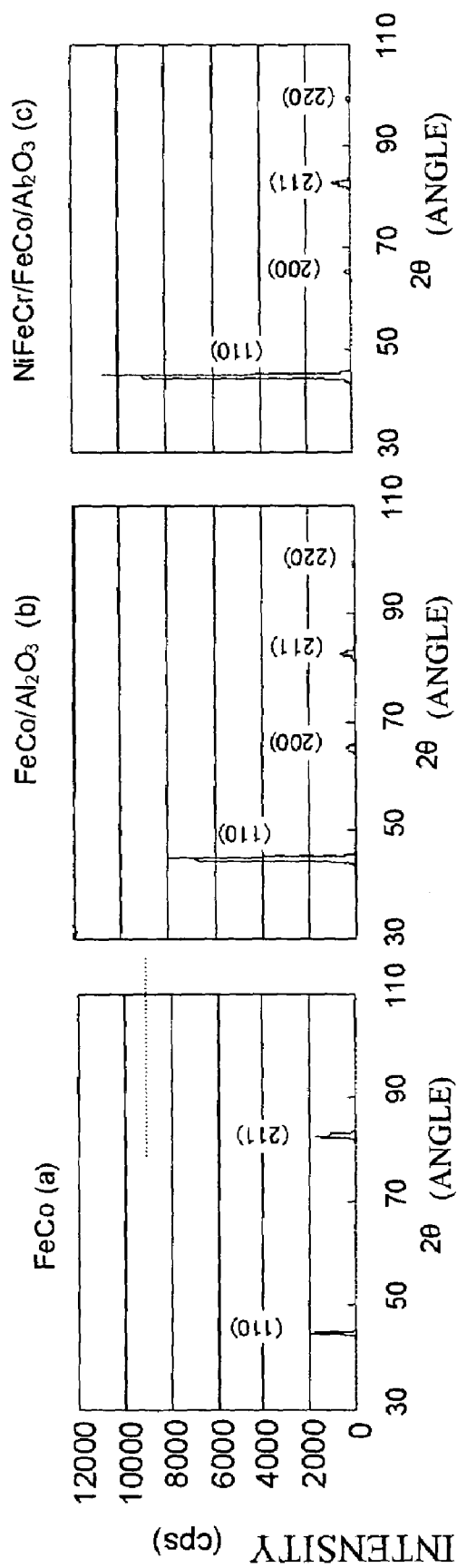

MAGNETIC HEAD WITH ALTERNATELY LAMINATED (110)-ORIENTATION-INDUCING NON-MAGNETIC UNDERLAYERS, MAGNETIC LAYERS, AND DISCONTINUOUS INSULATING LAYERS

This is a continuation of International Application No. PCT/JP03/05559, filed Apr. 30, 2003.

TECHNICAL FIELD

The present invention relates to a magnetic head and in more detail to a magnetic head including a write magnetic pole with superior magnetic response that can write data onto a high density medium that has a high coercive force.

BACKGROUND ART

As the areal density of media used in magnetic disk devices has increased, the size of the recording bits has fallen to several hundred nm or below, with recording bits being expected to become even smaller in the future. The problem of the thermal agitation of magnetic particles becomes significant in this size range, but it is thought that the problem can be solved by increasing the coercive force (Hc) of the medium. On the other hand, if the coercive force of the medium is increased, the write magnetic pole needs to be a narrow magnetic pole that can create a write magnetic field that is at least as strong as the coercive force of the medium. The magnetic material at the tip of the write magnetic pole therefore needs to have a higher Bs value (saturation magnetic flux density).

FeCo alloy is known as having a high Bs value of 2.45 T, but the magnetostrictive constant is high at $\lambda=30$ to $70\times10^{-6}$ and it is difficult to realize soft magnetism with only a single layer of FeCo alloy. Therefore FeCo alloy cannot be used in this state as the magnetic material of the write magnetic pole. Permeability can be given as an index of soft magnetism, and when the permeability of a magnetic pole of a write head is low, the magnetism of the magnetic pole becomes unresponsive in an induction field of a coil corresponding to the waveform of the recording bits, so that there is deterioration in the resolution of recording bits and the desired write characteristics cannot be obtained.

As methods of solving this problem, there is a method that provides an underlayer as a buffer directly below a FeCo alloy film and new materials have been developed, such as by mixing in a small amount of additional elements into the alloy. As one example, a soft magnetic layer with a high Bs value of around 2.4 T using an FeCoN composition was reported in IEEE. Trans. Magn., Vol. 36, pp. 2506-2508, (2000). However, since it is difficult to control magnetic anisotropy with a single film of FeCoN, soft magnetism has been improved by forming the FeCoN layer on a permalloy (Ni80F20) underlayer or by a construction where the FeCoN layer is sandwiched between permalloy layers. It should be noted that the above report describes an embodiment where the thickness of the FeCoN layer is 0.1 µm, and it is unclear whether soft magnetism is achieved with a thickness of 0.1 µm or above. In addition, to increase the write magnetic field, it is necessary to form the high Bs film used at the tip of the magnetic pole at least 0.1 µm thick.

Also, in Japanese Laid-Open Patent Publication No. H10-270246, a material with soft magnetism such that an anisotropic magnetic field $Hk>20$ (Oe), resistivity $\rho>50(\mu\Omega cm)$, and a Bs value$>1.6T$ is disclosed as a granular alloy film where additional elements have been added to FeCo. However, to raise the resistivity to $50(\mu\Omega cm)$ or above, it is necessary to increase the included amount of non-magnetic elements added to the magnetic elements, so that the saturation magnetic flux density falls and it is difficult to achieve a high Bs value of 2.1 T or above.

In this way, the reality is that a soft magnetic material that has a sufficiently high Bs value for actual use as the magnetic material of a write magnetic pole of a magnetic head is yet to be provided. This invention was conceived in view of these problems and provides a magnetic material that exhibits soft magnetism with a Bs value of 2.2T or above at a thickness of 0.1 µm or above. It is an object of this invention to provide, by using this magnetic material as the magnetic material of a write magnetic pole, a magnetic head that can be favorably used to write data onto a high-density medium with a high coercive force.

DISCLOSURE OF THE INVENTION

The present invention is a magnetic head including a write magnetic pole on which a magnetic film has been formed, wherein the magnetic film is formed by alternately laminating magnetic layers, which have iron (Fe) and cobalt (Co) as main components, and insulating layers, the insulating layers being formed as discontinuous films. By forming the magnetic film by alternately laminating the magnetic layers and the insulating layers formed of discontinuous films, it is possible to obtain a high Bs value of 2.2T or above, and it is possible to achieve a permeability that exceeds that of a magnetic film composed of a single layer, so that a magnetic head that can be favorably used to record onto a high-density medium with a high coercive force can be provided.

The insulating layers can be formed as discontinuous films by being formed with an average thickness that is no greater than the surface roughness of the magnetic layers. The insulating layers can also be formed as discontinuous films by being formed in clusters. By forming the insulating layers as discontinuous films, crystal growth of the magnetic layers is disrupted, and by doing so, the anisotropic variance of the layers that include FeCo is suppressed. Additionally, in a magnetic film in which magnetic layers are laminated via insulating layers that are discontinuously formed, the incidence of (110) orientation for the crystal faces of the magnetic layers is increased.

The present invention is also characterized by having non-magnetic layers that suppress anisotropic variance of the magnetic film formed as underlayers of the respective magnetic layers and by non-magnetic layers that induce (110) orientation for crystal faces of the magnetic layers being formed as underlayers of the respective magnetic layers. By providing non-magnetic layers as underlayers of the magnetic layers, it is possible to further suppress anisotropic variance and to further increase the soft magnetism.

Alumina ($Al_2O_3$) is favorably used as the insulating layers and an alloy of nickel (Ni), iron (Fe), and chromium (Cr) is favorably used as the non-magnetic layers.

In addition, the thicknesses of the magnetic layers and the insulating layers and the number of laminated layers can be adjusted so that the saturation magnetic flux density of the entire magnetic film is at least 2.2T. By doing so, a magnetic head that can sufficiently be applied to recording onto a high-density medium with a high coercive force can be provided.

BRIEF DESCRIPTION OF THE DRAWINGS

FIG. 6A is an X-ray diffraction pattern of the Fe70Co30 single film;

FIG. 6B is an X-ray diffraction pattern of the Fe70Co30/Al$_2$O$_3$ laminated film;

FIG. 6C is an X-ray diffraction pattern of the NiFeCr/Fe70Co30/Al$_2$O$_3$ laminated film.

BEST MODE FOR CARRYING OUT THE INVENTION

Preferred embodiments of the present invention will now be described in detail with reference to the drawings.

Figure 1A:
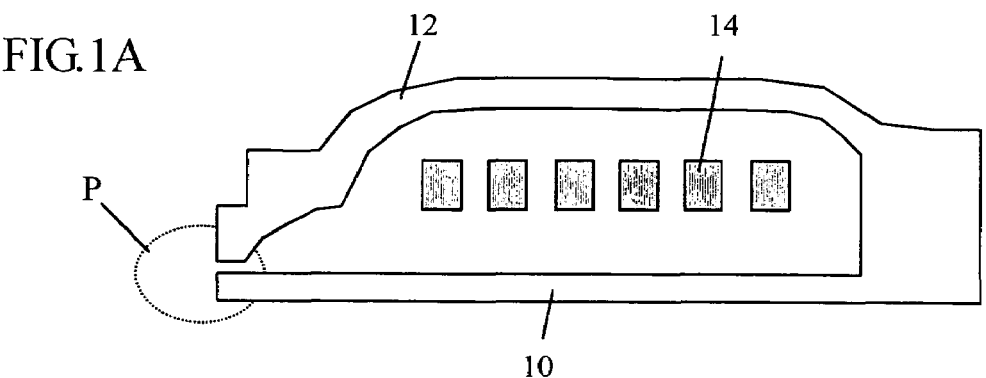
FIGS. 1A and 1B are cross-sectional views showing the construction of a write magnetic pole of a magnetic head.
Figure 1B:
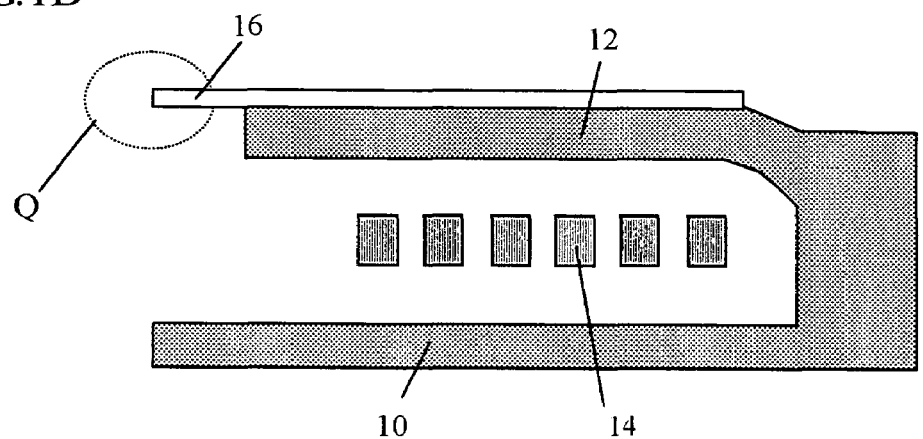

FIGS. 1A and 1B are cross-sectional views showing the constructions of write magnetic poles of a magnetic head. FIG. 1A shows a write magnetic pole for in-plane recording and FIG. 1B shows a write magnetic pole for perpendicular recording. Reference numeral 10 designates a lower magnetic pole, 12 an upper magnetic pole, and 14 a coil. The lower magnetic pole 10 and the upper magnetic pole 12 are composed of ferromagnetic members made of NiFe or the like.

In the write magnetic pole for in-plane recording, the tip of the lower magnetic pole 10 and the tip of the upper magnetic pole 12 are disposed facing one another at an interval that is the write gap. In the magnetic head according to the present invention, the pole tips (P part) of the lower magnetic pole 10 and the upper magnetic pole 12 that are disposed facing the surface of the medium are formed of a magnetic film (described later) with a high Bs value. Also, in the write magnetic pole for perpendicular recording, a magnetic pole 16 for perpendicular recording is provided so as to extend from the upper magnetic pole 12 toward the surface of the medium, and the tip (Q part) of the magnetic pole 16 is formed of a magnetic film (described later) with a high Bs value.

The magnetic film forming the write magnetic pole is formed with a predetermined thickness by sputtering or the like. FIGS. 2A to 2D are diagrams showing representations of the cross-sectional constructions of magnetic films used to test the characteristics of magnetic films that are used on the write magnetic pole(s) of a magnetic head.

Figure 2A:
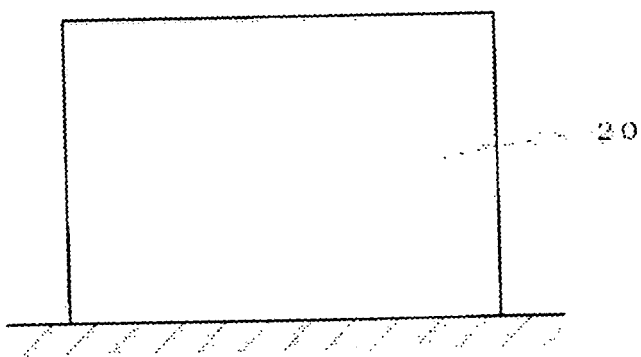
FIG. 2A is a diagram useful in explaining the film construction of a Fe70Co30 single film.

The magnetic film shown in FIG. 2A is produced by forming a magnetic film 20 composed of a single layer of Fe70Co30 on a substrate. The overall thickness of the magnetic film 20 is 1 μm.

Figure 2B:
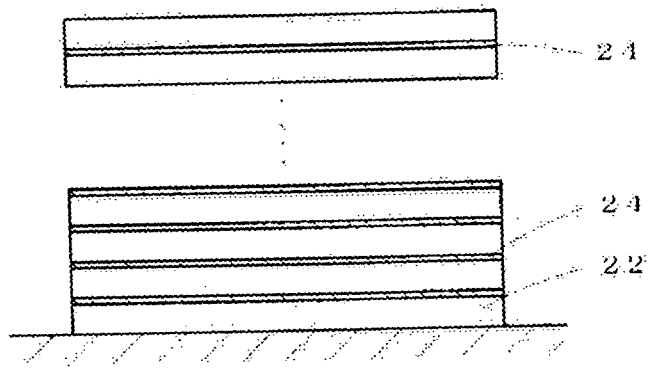
FIG. 2B is a diagram useful in explaining the film construction of a Fe70Co30/Al$_2$O$_3$ laminated film.

FIG. 2B shows a magnetic film in which magnetic layers 22 composed of Fe70Co30 and insulating layers 24 composed of alumina (Al$_2$O$_3$) are alternately laminated. The thickness of the respective magnetic layers 22 is 100 nm and the thickness of the respective insulating layers 24 is 1 nm. A total of ten magnetic layers 22 are laminated and at 1 m, the total thickness of the magnetic layers 22 is the same as that of the magnetic film 20 shown in FIG. 2A.

Figure 2C:
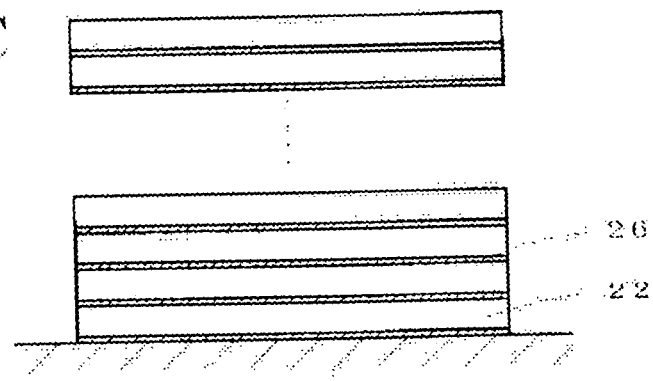
FIG. 2C is a diagram useful in explaining the film construction of a NiFeCr/Fe70Co30 laminated film.

FIG. 2C shows a magnetic film formed by alternately laminating non-magnetic layers 26 composed of Ni61Fe14Cr25 and magnetic layers 22 composed of Fe70Co30. The thickness of the respective magnetic layers 22 is 100 nm and the thickness of the respective non-magnetic layers 26 is 2 nm. Ten magnetic layers 22 are laminated and the total thickness of the magnetic layers 22 is 1 μm.

Figure 2D:
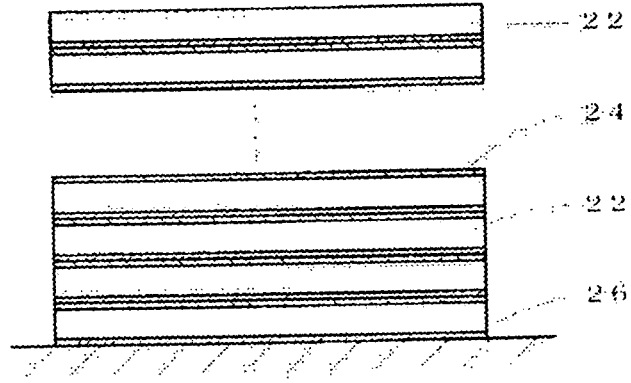
FIG. 2D is a diagram useful in explaining the film construction of a NiFeCr/Fe70Co30/Al$_2$O$_3$ laminated film.
Figure 3A:
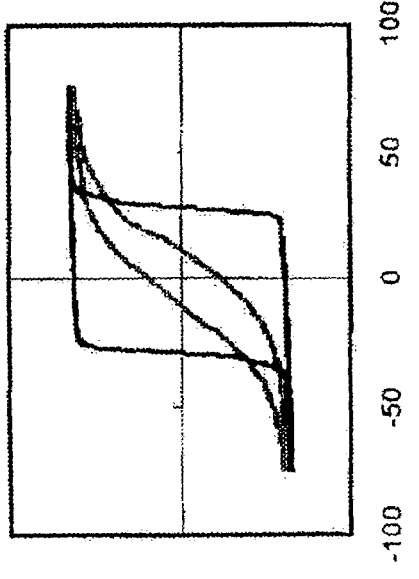
FIGS. 3A to 3D are B-H curves for the respective magnetic films shown in FIGS. 2A to 2D.
Figure 3C:
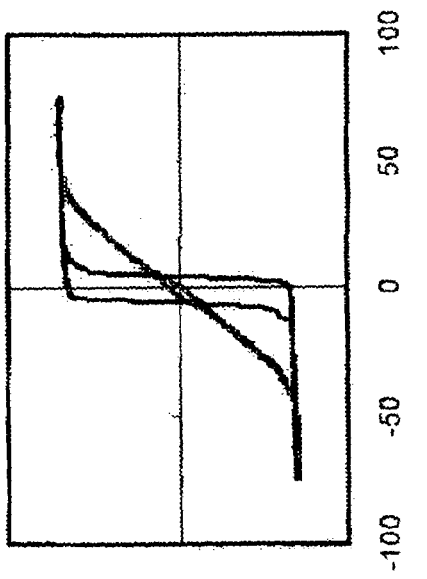
Figure 3B:
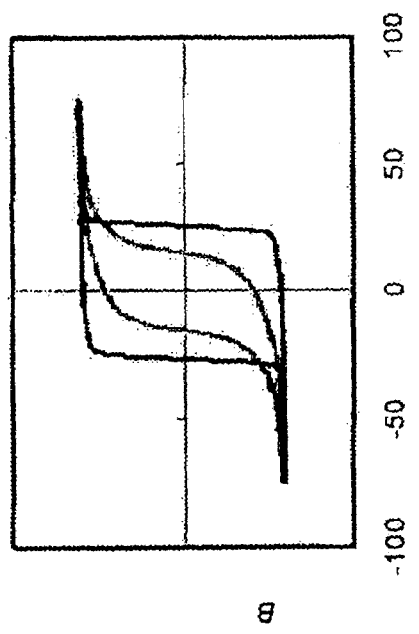
Figure 3D:
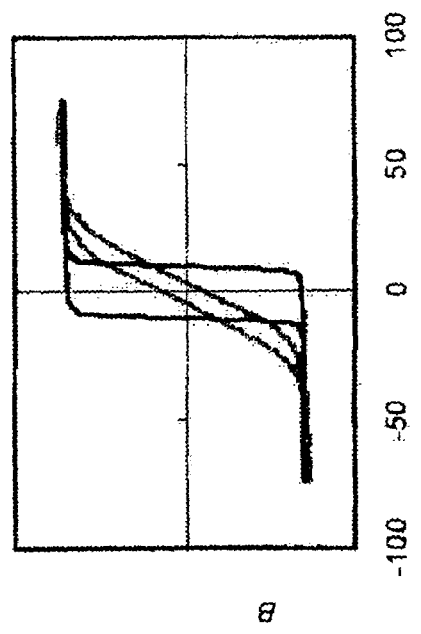

FIG. 2D shows a magnetic film formed by alternately laminating non-magnetic layers 26 composed of Ni61Fe14Cr25, magnetic layers 22 composed of Fe70Co30, and insulating layers 24 composed of Al$_2$O$_3$ in that order on a substrate. The thickness of the respective non-magnetic layers is 2 nm, the thickness of the respective magnetic layers 22 is 100 nm, and the thickness of the respective insulating layers 24 is 1 nm. Ten magnetic layers 22 are laminated and the total thickness of the magnetic layers 22 is 1 μm. It should be noted that the compositions of NiFeCr and FeCo are expressed using at% notation.

These samples were formed by forming layers by sputtering. During sputtering, the pressure is 0.1 to 3 Pa, the sputtering input power density is 1 to $10 \times 10^{-4} W/m^2$, and the flow rate of argon (Ar) is 50 to 100 sccm. The gap between the target and the substrate is 90 to 180 mm. Al$_2$O$_3$—TiC is used as the substrate on which the magnetic films are formed and no bias is applied. It should be noted that the same results are obtained when other insulating materials aside from Al$_2$O$_3$, such as SiO$_2$ and MgO, are used as the oxide target. In this embodiment, the layers were formed using an Al$_2$O$_3$ target in a single vacuum chamber, but the same results are obtained when oxidizing is carried out in a different vacuum chamber after first forming an Al film or when Al$_2$O$_3$ is deposited in cluster form.

FIG. 3 shows B-H curves for the respective magnetic layers shown in FIGS. 2A to 2D. These B-H curves were produced by applying a ±70 Oe magnetic field in the axis of easy magnetization and the axis of difficult magnetization in a B-H loop tracer. By comparing the B-H curves for the case of a film that is a single layer of Fe70Co30 (FIG. 3A) and a laminated film of Fe70Co30 and Al$_2$O$_3$ (FIG. 3B), it can be seen that compared to the single layer of Fe70Co30, the coercive force Hch in the axis of difficult magnetization drops and the anisotropic variance is suppressed for the laminated film of Al$_2$O$_3$ and Fe70Co30 where Al$_2$O$_3$ has been added.

Also, by comparing the laminated film of NiFeCr/Fe70Co30 that uses NiFeCr as underlayers (see FIG. 3C) and the laminated film of NiFeCr/Fe70Co30/Al$_2$O$_3$ (see FIG. 3D), the coercive force Hch in the axis of difficult magnetization drops for the NiFeCr/Fe70Co30/Al$_2$O$_3$ laminated film where Al$_2$O$_3$ has been added. This shows that when layers of Al$_2$O$_3$ are added, the coercive force Hch in the axis of difficult magnetization drops, so that the material can be favorably used as a magnetic film applied to a write magnetic pole.

TABLE 1

| Thickness Ni$_{61}$Fe$_{14}$Cr$_{25}$/Fe$_{70}$Co$_{30}$/Al$_2$O$_3$ | | | No. of laminated layers | Bs (T) | Relative Permeability μ$_r$ at 100 MH$_z$ |
|---|---|---|---|---|---|
| — | 1000 | — | — | 2.45 | 132 |
| — | 100 | 1 | 10 | 2.43 | 202 |
| 2 | 100 | — | 10 | 2.40 | 283 |
| 2 | 100 | 1 | 10 | 2.38 | 419 |

Table 1 shows the Bs values and relative permeabilities of the four types of magnetic film shown in FIGS. 2A and 2D. The Bs values are values measured by applying a 10kOe magnetic field using a SQUID. The measurements of relative permeability were measured using a shielded loop coil. When looking at the Fe70Co30/Al$_2$O$_3$ laminated film and the NiFeCr/Fe70Co30/Al$_2$O$_3$ laminated film to which Al$_2$O$_3$ layers have been added in Table 1, the Bs values are such that Bs>2.3T, so that equivalent Bs values to the single layer of Fe70Co30 are obtained while the relative permeabilities greatly exceed that of the single layer of Fe70Co30. Also, regarding the laminated films in which Al$_2$O$_3$ layers have been added, the relative permeability is greatly improved in both the case of the Fe70Co30/Al$_2$O$_3$ laminated film and the NiFeCr/Fe70Co30/Al$_2$O$_3$ laminated film.

Figure 5:
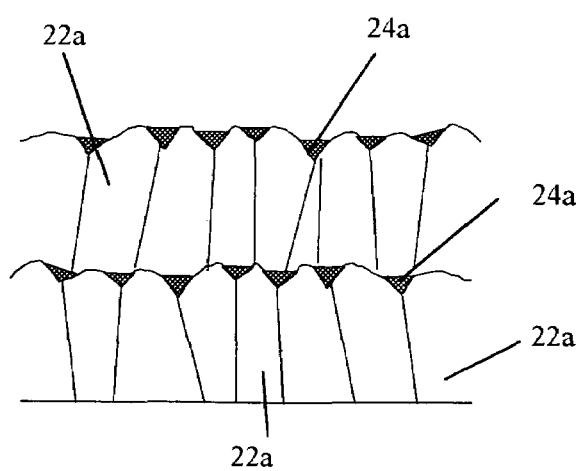
FIG. 5 is a diagram useful in explaining the state where Fe70Co30 and the like and discontinuous Al$_2$O$_3$ layers are alternately laminated.
Figure 4:
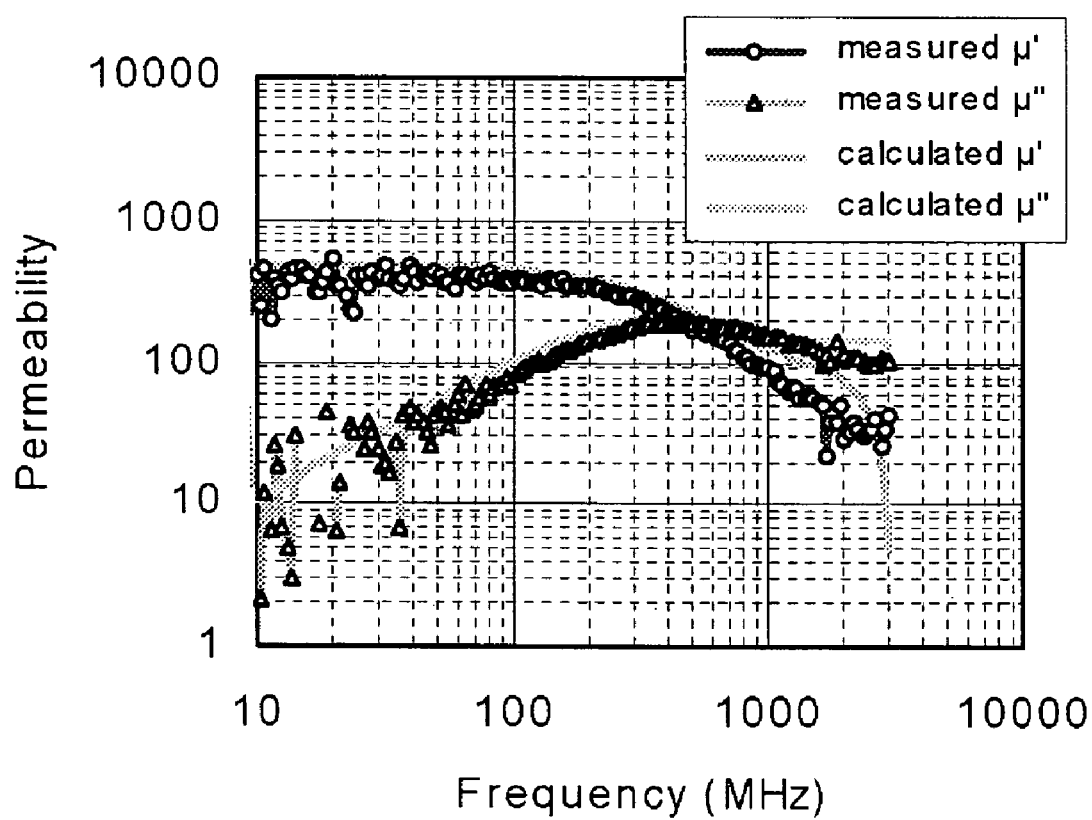
FIG. 4 is a graph showing the frequency characteristics of the relative permeability of the NiFeCr/Fe70Co30/Al$_2$O$_3$ laminated film.

FIG. 4 shows the frequency dependency of the relative permeability μr of the NiFeCr/Fe70Co30/Al$_2$O$_3$ laminated film. Normally, when magnetic layers are separated by Al$_2$O$_3$ layers, eddy current loss is suppressed, so that the drop in permeability at high frequency should also be suppressed. However, as shown in FIG. 4, the theoretically calculated curves for an Fe70Co30 single layer with a thickness of 1 μm substantially match the actual measurement curves for the NiFeCr/Fe70Co30/Al$_2$O$_3$ laminated film, and no suppression of eddy current loss is observed (i.e., the permeability drops at high frequencies). This is believed to be due to the insulating layers composed of Al$_2$O$_3$ being formed not as continuous films in two dimensions that separate the magnetic layers but being distributed in a discontinuous manner so that adjacent magnetic layers are not electrically or magnetically separated. That is, the Al$_2$O$_3$ layers in the present embodiment are believed to be discontinuous as shown in FIG. 5 due to reasons such as the average thickness of the Al$_2$O$_3$ being thin and the surface roughness of the magnetic layers 22 composed of FeCo preventing uniform growth of the Al$_2$O$_3$. In FIG. 5, reference numeral 22a designates the crystal grains of FeCo and 24a the discontinuous layers of Al$_2$O$_3$.

It should be noted that as shown in FIG. 4, when the relative permeability drops at high frequencies, if a laminated film according to the present invention is used for an existing yoke part whose thickness is a few μm thick, deterioration of the write characteristics at high recording frequencies is expected. However, when the laminated film is used for a yoke part, the tips of magnetic poles, and/or the single magnetic pole of a perpendicular head that are realized in a submicron size, the size is no greater than the depth of penetration so that eddy current loss is suppressed due to a size effect. In such applications, the superiority of the laminated film according to the present invention compared to an FeCo single layer is realized.

The results of measuring X-ray diffraction patterns are shown for the Fe70Co30 single layer in FIG. 6A, for the Fe70Co30/Al$_2$O$_3$ laminated film in FIG. 6B, and for the NiFeCr/Fe70Co30/Al$_2$O$_3$ laminated film in FIG. 6C. From these samples, it can be understood that the magnitude relationship for the relative permeability is (c)>(b)>(a), and the (110) peak of the diffraction line is (c)>(b)>(a). This shows that there is a tendency for the relative permeability to rise and the (110) orientation to increase when Al$_2$O$_3$ layers are inserted.

Figure 7A:
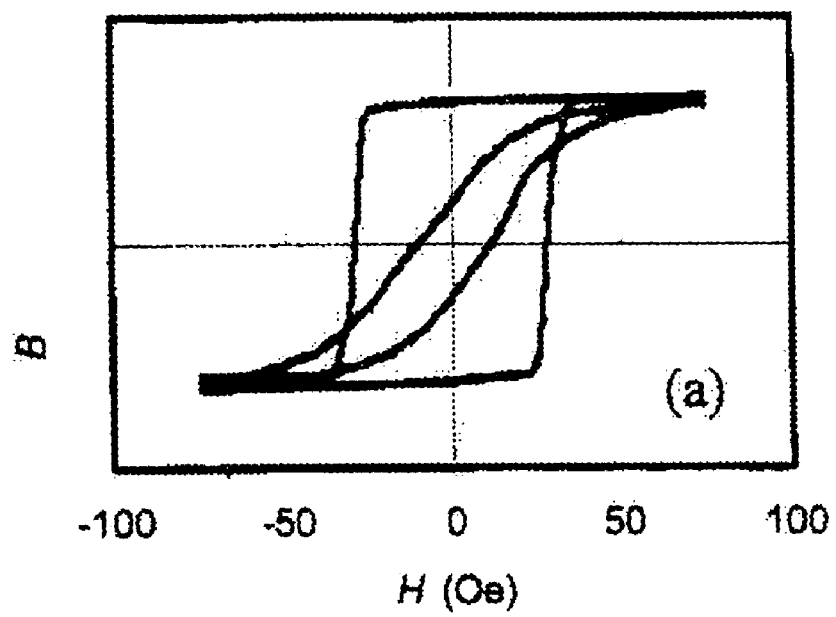
FIGS. 7A and 7B are B-H curves for the case where the thickness of the Al$_2$O$_3$ layer changes.
Figure 7B:
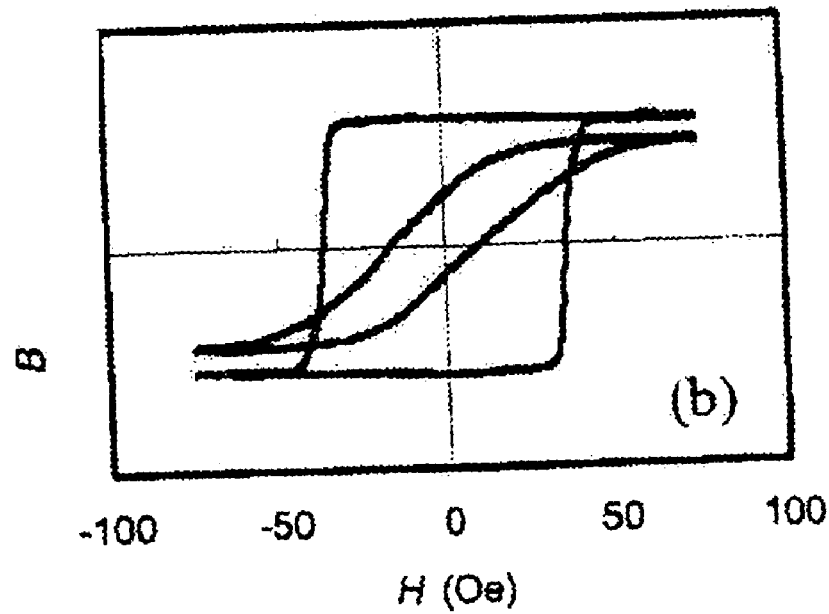

FIG. 7 shows the respective B-H curves for the case when insulating layers composed of Al$_2$O$_3$ are laminated with a thickness of 1 nm (FIG. 7A) and the case when insulating layers composed of Al$_2$O$_3$ are laminated with a thickness of 20 nm (FIG. 7B). By looking at these graphs, it can be understood that no improvement in the soft magnetism is observed when the thickness of the insulating layers composed of Al$_2$O$_3$ is increased.

TABLE 2

| Thickness Fe$_{70}$Co$_{30}$/Al$_2$O$_3$ | | No. of laminated layers | Bs (T) | Relative Permeability μ$_r$ at 100 MH$_z$ |
|---|---|---|---|---|
| 100 | 1 | 10 | 2.43 | 202 |
| 100 | 20 | 10 | 2.04 | 170 |

Table 2 shows the Bs value and the relative permeability when the thickness of the insulating layers composed of Al$_2$O$_3$ is changed. When the thickness of the insulating layers composed of Al$_2$O$_3$ is increased, the Bs value falls to 2.04T and the relative permeability also falls. That is, if the insulating layers composed of Al$_2$O$_3$ are formed thickly, it is thought that the Al$_2$O$_3$ layers will be formed continuously and the relative permeability will fall, so that it is believed that a laminated film in which the insulating layer is formed discontinuously will be superior for the soft magnetism characteristics.

The invention claimed is:

1. A magnetic head including a write magnetic pole on which a magnetic film has been formed,
   wherein the magnetic film is formed by alternately laminating magnetic layers, which have iron (Fe) and cobalt (Co) as main components, on non-magnetic layers and insulating layers, the insulating layers being formed as discontinuous films, and
   the non-magnetic layers induce (110) orientation for crystal faces of the magnetic layers and are formed as underlayers of the respective magnetic layers.

2. A magnetic head according to claim 1,
   wherein the insulating layers are formed as discontinuous films by being formed with an average thickness that is no greater than the surface roughness of the magnetic layers.

3. A magnetic head according to claim 1,
   wherein the insulating layers are formed as discontinuous films by being formed in clusters.

4. A magnetic head according to claim 1,
   wherein the non-magnetic layers suppress anisotropic variance of the magnetic film.

5. A magnetic head according to claim 1,
   wherein the thicknesses of the magnetic layers and the insulating layers and the number of laminated layers are adjusted so that the saturation magnetic flux density of the entire magnetic film is at least 2.2T.

6. A magnetic head according to claim 1,
   wherein alumina (Al$_2$O$_3$) is used as the insulating layers.

* * * * *